US011782310B2

(12) United States Patent
Lu et al.

(10) Patent No.: US 11,782,310 B2
(45) Date of Patent: Oct. 10, 2023

(54) BACKLIGHTING FOR DISPLAY SYSTEMS

(71) Applicant: 3M INNOVATIVE PROPERTIES COMPANY, St. Paul, MN (US)

(72) Inventors: Yu Hsin Lu, Dacun Township (TW); Gary T. Boyd, Woodbury, MN (US); Matthew B. Johnson, Woodbury, MN (US); Ryan T. Fabick, Shoreview, MN (US); Carl A. Stover, St. Paul, MN (US); Adam D. Haag, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/073,813

(22) Filed: Dec. 2, 2022

(65) Prior Publication Data
US 2023/0176419 A1    Jun. 8, 2023

Related U.S. Application Data

(60) Provisional application No. 63/265,073, filed on Dec. 7, 2021.

(51) Int. Cl.
*G02F 1/00* (2006.01)
*G02F 1/13357* (2006.01)
(Continued)

(52) U.S. Cl.
CPC ......... *G02F 1/133606* (2013.01); *G02B 1/04* (2013.01); *G02F 1/133514* (2013.01); *G02F 1/133536* (2013.01); *G02F 1/133603* (2013.01)

(58) Field of Classification Search
CPC ......... G02F 1/133514; G02F 1/133536; G02F 1/133606; G02F 1/133603; G02B 1/04
See application file for complete search history.

(56) References Cited

U.S. PATENT DOCUMENTS

2007/0236628 A1    10/2007    Epstein
2013/0335677 A1    12/2013    You
(Continued)

FOREIGN PATENT DOCUMENTS

EP    3627215 B1    3/2022
WO    2019067095 A1    4/2019
(Continued)

*Primary Examiner* — Gerald J Sufleta, II
(74) *Attorney, Agent, or Firm* — Clifton F. Richardson; Robert S. Moshrefzadeh (57) ABSTRACT

A display system includes a light source configured to emit light from a light exit surface, the emitted light having an emitted wavelength. An optical filter is disposed on the light exit surface of the light source. One or more light converting films are disposed between the optical filter and the light exit surface of the light source. The one or more light converting films are configured to receive the emitted light from the light source and convert at least portions of the received emitted light to blue, green, and red lights having respective blue, green and red wavelengths. For a substantially normally incident light and for at least an in-plane first polarization state, the optical filter reflects more than about 80% of the incident light having the emitted wavelength, and transmits greater than about 60% of the incident light for each of the blue, green and red wavelengths.

19 Claims, 8 Drawing Sheets

(51) Int. Cl.
*G02B 1/04* (2006.01)
*G02F 1/1335* (2006.01)

(56) References Cited

U.S. PATENT DOCUMENTS

| | | |
|---|---|---|
| 2018/0059482 A1 | 3/2018 | Li et al. |
| 2019/0286975 A1* | 9/2019 | Feinberg ................ G06F 17/15 |
| 2020/0019019 A1 | 1/2020 | LIU et al. |
| 2020/0089054 A1* | 3/2020 | Lim ................ G02F 1/133603 |
| 2020/0142259 A1* | 5/2020 | Liu ................ G02F 1/133514 |

FOREIGN PATENT DOCUMENTS

| | | | |
|---|---|---|---|
| WO | 2019177755 A1 | 9/2019 | |
| WO | WO-2021156728 A1 * | 8/2021 | ............. G02B 5/305 |

* cited by examiner

BACKLIGHTING FOR DISPLAY SYSTEMS

TECHNICAL FIELD

The present disclosure generally relates to backlit display systems having an LED array light source for uniform illumination.

BACKGROUND

Display systems, such as liquid crystal display (LCD) systems, are used in a variety of applications and commercially available devices such as, for example, computer monitors, laptops, personal digital assistants (PDAs), mobile phones, miniature music players, display for automotive, and thin LCD televisions. Many LCDs include a liquid crystal panel and an extended area light source, often referred to as a backlight, for illuminating the liquid crystal panel. The backlight generally includes an illumination device, which may include light sources such as light emitting diodes or fluorescent lamps, and a number of light management films between the illumination device and the LCD panel. In general, the light management films enhances the operation of a display by promoting more efficient and effective use of light.

SUMMARY

In some aspects of the present disclosure, a display system including an extended light source configured to emit light from a light exit surface thereof, the emitted light having an emitted wavelength, is provided. A first optical filter is disposed on, and is substantially co-extensive in a length and a width with, the light exit surface of the extended light source. The first optical filter includes a plurality of polymeric layers numbering at least 10 in total. Each of the polymeric layers has an average thickness of less than about 500 nm. One or more light converting films are disposed between the first optical filter and the light exit surface of the extended light source. The one or more light converting films include one or more light converting materials configured to receive the emitted light from the extended light source and convert at least portions of the received emitted light to blue, green, and red lights having respective blue, green and red wavelengths. For a substantially normally incident light and for at least an in-plane first polarization state, the plurality of the polymeric layers reflects more than about 80% of the incident light having the emitted wavelength, and transmits greater than about 60% of the incident light for each of the blue, green and red wavelengths.

In some other aspects of the present disclosure, a display system including one or more light sources configured to emit a source light including a source spectrum having an intensity source peak at a source peak wavelength is provided. One or more light converting regions are configured to receive the source light from the one or more light sources and in response, emit a converted light including blue, green and red converted spectra including respective blue, green and red converted peaks at respective blue, green and red converted peak wavelengths. The blue converted peak wavelength is greater than the source peak wavelength. The blue, green and red converted peak wavelengths are at least 20 nm apart from each other and are disposed in a visible wavelength range extending from about 420 nm to about 680 nm. The display system includes an optical filter configured to receive and selectively transmit the converted light. For each of in-plane orthogonal first and second polarization states and for incident angles of up to at least 20 degrees, the optical filter has an optical reflectance of more than about 60% at the source peak wavelength, and an optical transmittance of greater than about 60% at each of the blue, green and red converted peak wavelengths.

In some aspects of the present disclosure, a display system including an extended light source configured to emit light from an emission surface thereof is provided. The emitted light has first, second, third and fourth emission spectra including respective first, second, third and fourth emission peaks at respective first, second, third and fourth peak wavelengths with respective non-overlapping first, second, third and fourth full width at half maxima. An optical filter is disposed on, and substantially co-extensive in a length (x-axis) and a width (y-axis) with, the emission surface of the extended light source. The optical filter includes a plurality of polymeric layers numbering at least 10 in total, each of the polymeric layers having an average thickness of less than about 500 nm. For each of in-plane orthogonal first and second polarization states and for incident angles of up to at least 20 degrees, the optical filter has an optical reflectance of more than about 60% at the first peak wavelength, and an optical transmittance of greater than about 60% at each of the second, third and fourth peak wavelengths.

In some aspects of the present disclosure, an optical stack is provided. The optical stack includes one or more light converting films configured to receive a first light having a first spectra including a first peak at a first peak wavelength and a corresponding first full width at half maximum (FWHM). The one or more light converting films, in response, emit light having second, third and fourth emission spectra including respective second, third and fourth emission peaks at respective second, third and fourth peak wavelengths with respective second, third and fourth FWHMs. The first, second, third and fourth FWHMs are non-overlapping. An optical filter disposed on, and substantially co-extensive in a length and a width with, the one or more light converting films includes a plurality of polymeric layers numbering at least 10 in total, each of the polymeric layers having an average thickness of less than about 500 nm. For each of in-plane orthogonal first and second polarization states and for incident angles of up to at least 20 degrees, the optical filter has an optical reflectance of more than about 60% at the first wavelength, and an optical transmittance of greater than about 60% at each of the second, third and fourth peak wavelengths.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Liquid Crystal Displays (LCDs) require a backlight unit as an illuminator that is efficient and uniform spatially, angularly, and spectrally. One method of illumination uses edge-lit backlight units having light-emitting diodes that emit light into an edge surface of a light guide plate. The light guide plate then distributes the emitted light laterally across the display to serve as backlight illumination. Another method utilizes direct-lit backlight units having light-emitting diodes (LEDs) arranged in a planar array (2-D) that emit light vertically through the display. The 2-D arrangement allows brightness control of one or more LEDs to dynamically vary the illumination distribution in coordination with the LCD panel image. This backlighting technique is an effective means to provide a wide range of brightness for independent regions of the display, referred to as High Dynamic Range (HDR), improving the user visual experience.

Backlights generally incorporate light management films above the light source to achieve backlight brightness, efficiency, spatial uniformity over the area of the output face, polarization requirements (e.g. whether polarized light output is necessary or desirable), as well as cost, complexity, size, ease of manufacture or assembly, and/or combinations thereof. It is often desired that backlighting arrangements including the light management films have a minimal total thickness. Direct-lit backlights may, in some instances, be bulky or may produce non-uniform backlight illumination.

Embodiments described herein address these and other challenges to improve luminous and color uniformity with minimal total thickness of LCD backlight units.

Figure 1:
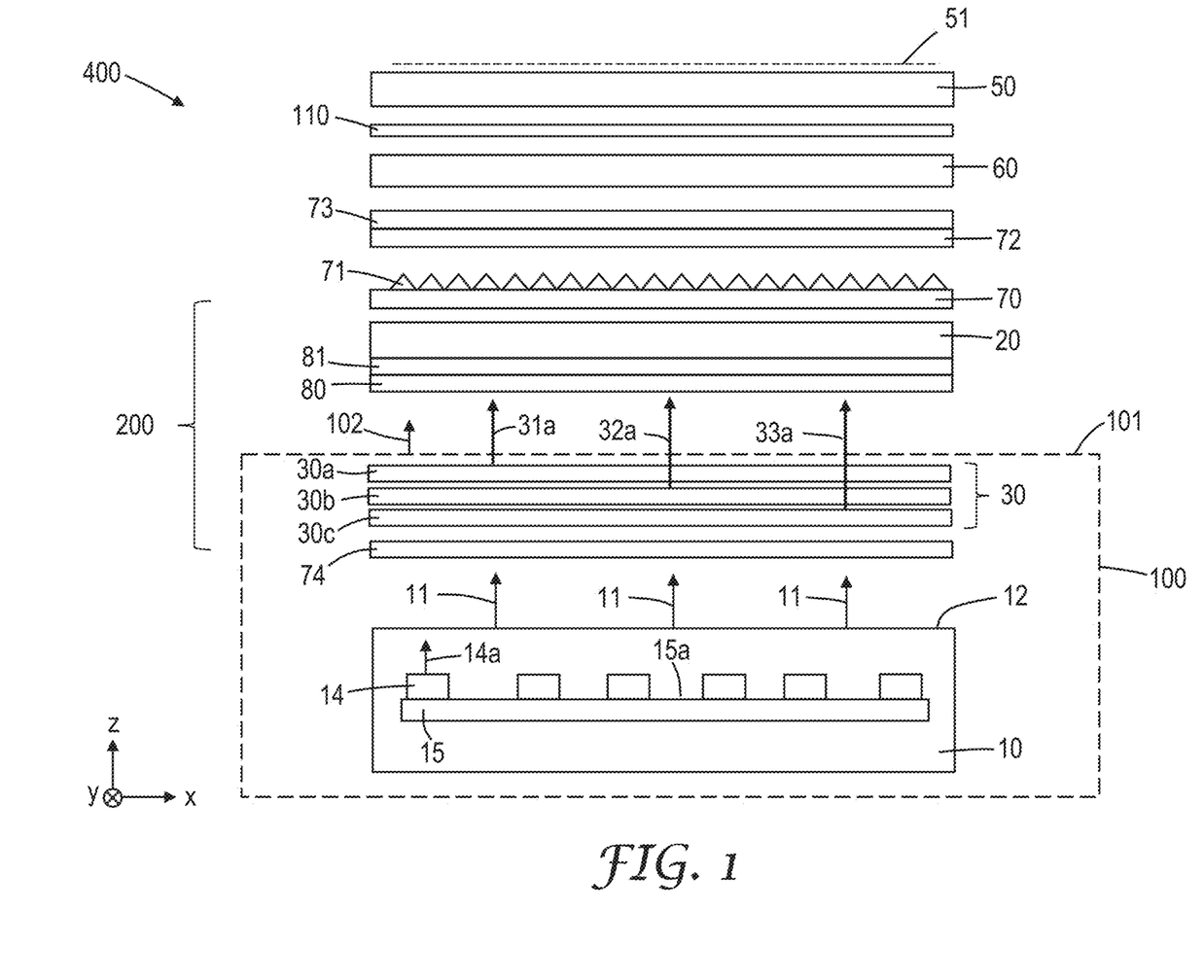
FIG. 1 is a schematic cross-sectional view of a display system according to some embodiments.

FIG. 1 is a schematic cross-sectional view of an illustrative display system (400) according to some embodiments. The display system (400) includes a display device (50) illuminated from behind by a backlight system. The display system (400) is shown in the context of a Cartesian x-y-z coordinate system, where the z-axis substantially corresponds to an optical axis of the display panel (50) and the backlight. The display device (50), in some aspects, may include a liquid crystal display (LCD) panel. The LCD panel may have a multitude of electronically addressable picture elements (pixels) to enable electronically addressable images. However, in some embodiments the display device (50) may be of a simpler design and may not include an LCD panel. For example, the display device may be or include a light-transmissive film or other substrate on which is printed a static image.

Figure 5:
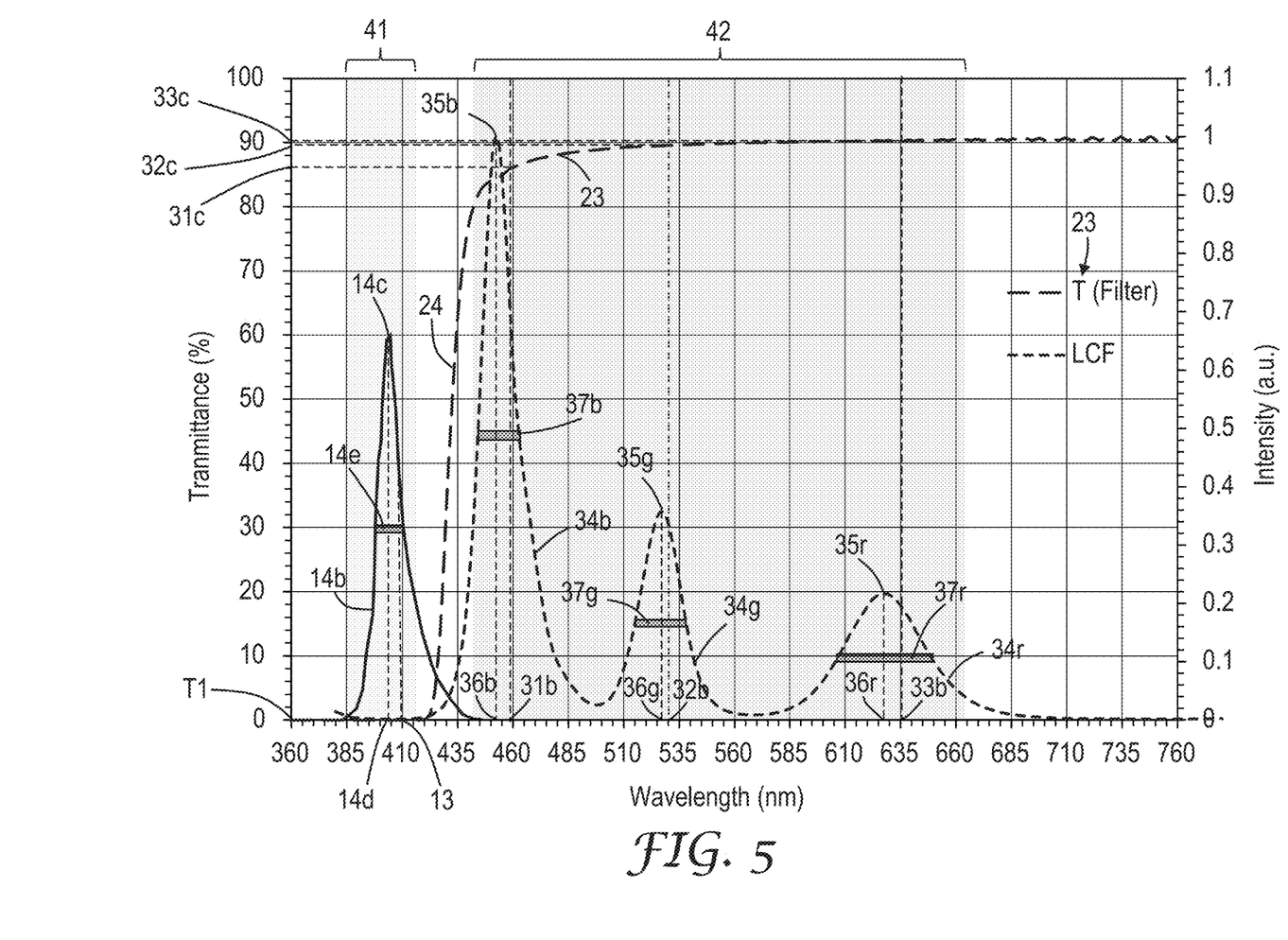
FIG. 5 illustrates the emission curve of the light emitted by the light emitting sources, the transmittance versus wavelength of the optical filter for normally incident light, and the emission curve of the light conversion film according to some embodiments.

The backlight system includes an extended light source (10) configured to emit light (11) from a light exit surface (12) thereof. The emitted light (11) may have an emitted wavelength (13) as shown in FIG. 5. The emitted wavelength (13) may be less than 440 nm, or less than 420 nm, or less than 410 nm. The extended light source (10) may include one or more light emitting sources (14) configured to generate source light (14a) exiting the light exit surface (12). The one or more light emitting sources (14) may include a 2-D array of discrete light sources formed by placing the light emitting sources (14) in a square pattern or in any rectangular pattern as desired. The actual number of light emitting sources (14) needed depends on the size of the display device (50), the luminous flux of each light source (14), and the desired brightness. In some aspects, the one or more light emitting sources (14) may include a plurality of discrete light emitting diodes (LEDs). The LEDs that form the 2-D array of discrete light sources are in electrical communication such that the LEDs can operate in a series or parallel manner or a combination of series and parallel as desired.

In some aspects, the one or more light emitting sources (14) may be disposed on a common substrate (15). In some aspects, the common substrate (15) may be a circuit board having a plurality of electrically conductive traces connected to the light emitting sources (14) for energizing and controlling a light emission of the light emitting sources (14). In regions (15a) between the one or more light emitting sources (14), the common substrate (15) may have an optical reflectance of greater than about 50%, or greater than about 60%, or greater than about 70%, or greater than about 80%, or greater than about 90%, or greater than about 95% for at least the emitted wavelength (13).

The display system (400) in some embodiments includes a first optical filter (20) disposed on the light exit surface (12) of the extended light source (10). In some aspects, the first optical filter (20) may be substantially co-extensive in a length (x-axis) and a width (y-axis) with the light exit surface (12) of the extended light source (10). The first optical filter (20) is configured to reflect light from the light emitting sources (14) and provide increased luminance uniformity with relative thinner thickness of the backlight system as will be described further.

Figure 4:
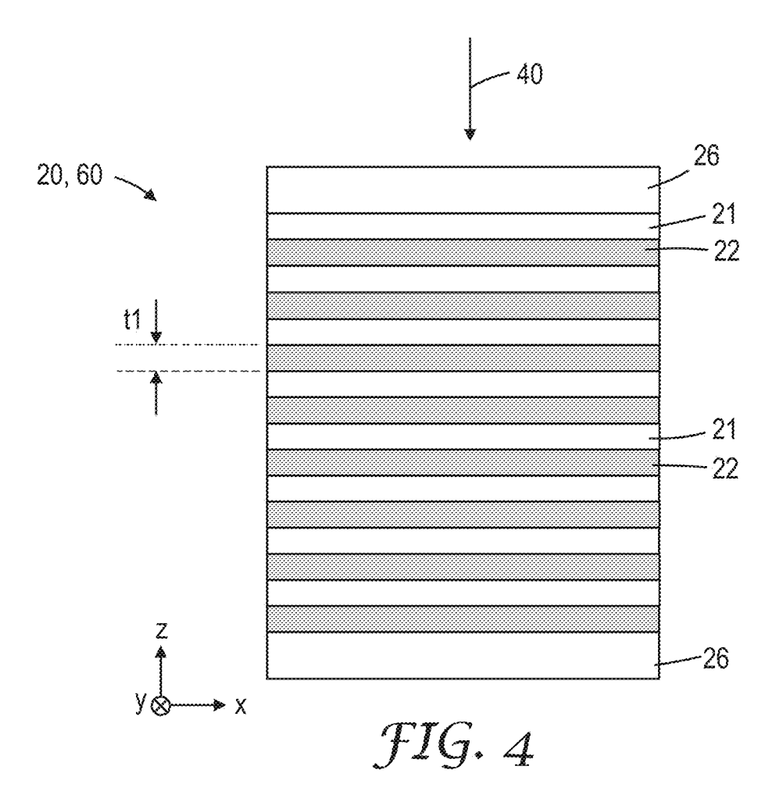
FIG. 4 is a schematic cross-sectional view of a multilayer optical construction of an optical filter according to some embodiments.

The first optical filter (20) may be configured as a multilayer polymeric optical film including a plurality of polymeric layers (21, 22), as shown in FIG. 4. The polymeric layers (21, 22) may reflect or transmit light primarily by constructive or destructive optical interference. For instance, the polymeric layers (21, 22) may have different refractive index characteristics so that some light is reflected at interfaces between adjacent layers.

In some embodiments, the plurality of polymeric layers (21, 22) may include a plurality of alternating first (21) and second (22) polymeric layers having respective indices of refraction $nx1$ and $nx2$ along a same in-plane first direction (x-axis) parallel to a first polarization state, $ny1$ and $ny2$ along a same in-plane second direction (y-axis) orthogonal to the first direction (x-axis), and $nz1$ and $nz2$ along a thickness direction (z-axis) orthogonal to the first (x-axis) and second (y-axis) directions. These indices represent the refractive index of the subject material for light polarized along mutually orthogonal x-axis, y-axis, and z-axis, respectively. In some aspects, a magnitude of a difference between nx1 and nx2 may be greater than about 0.01, or greater than about 0.02, or greater than about 0.03, or greater than about 0.04, or greater than about 0.05. In some aspects, a magnitude of a difference between ny1 and ny2 may be less than about 0.01 or less than about 0.008, or less than about 0.006, or less than about 0.005, or less than about 0.004, or less than about 0.002. In some aspects, a magnitude of a difference between nz1 and nz2 may be less than about 0.01, or less than about 0.008, or less than about 0.006, or less than about 0.005, or less than about 0.004, or less than about 0.002.

The polymeric layers (21, 22) may be sufficiently thin so that light reflected at a plurality of interfaces undergoes constructive or destructive interference to give the optical filter (20) the desired reflective or transmissive properties. The polymeric layers (21, 22) may include one or more of a polycarbonate, a polymethyl methacrylate (PMMA), a polyethylene terephthalate (PET), a glycol-modified polyethylene terephthalate (PETG), a polyethylene naphthalate (PEN), and a PEN/PET copolymer. The first polymeric layers (21) may be substantially isotropic, i.e., nx~ny and the second polymeric layers (22) may be substantially birefringent. For example, the polymeric layers (21, 22) may be designed using alternating layers of birefringent PEN and isotropic PMMA. Other combinations of high and low index materials may be used, such as alternating PET and PMMA layers.

In some aspects, the first polymeric layers (21) may include greater than about 5% by weight of polyethylene terephthalate (PET). In some cases, the first polymeric layers (21) may include greater than about 10%, or greater than about 20%, or greater than about 30%, or greater than about 40%, or greater than about 50% by weight of polyethylene terephthalate (PET). The second polymeric layers (22) may include greater than about 5% by weight of a copolyester. In some cases, the second polymeric layers (22) may include greater than about 10%, or greater than about 20%, or greater than about 30%, or greater than about 40%, or greater than about 50% by weight of a copolyester. In some aspects, the second polymeric layers (22) may include greater than about 5% by weight of an acrylic. In some cases, the second polymeric layers (22) may include greater than about 10%, or greater than about 20%, or greater than about 30%, or greater than about 40%, or greater than about 50% by weight of an acrylic. In some cases, each of the polymeric layers may include less than about 5% of dimethyl 2,6-naphthalene dicarboxylate. In some instances, each of the polymeric layers may include less than about 4%, or less than about 3%, or less than about 2%, or less than about 1%, or less than about 0.5%, or less than about 0.25%, or less than about 0.1% of dimethyl 2,6-naphthalene dicarboxylate. In some other instances, the polymeric layers may not include dimethyl 2,6-naphthalene dicarboxylate.

The number of the plurality of polymeric layers (21, 22) may be at least 10, or at least 20, or at least 50, or at least 75, or at least 100, or at least 150, or at least 200, or at least 250, or at least 300, or at least 400 in total. Each of the polymeric layers (21, 22) may have an average thickness (t1) of less than about 500 nm. In some instances, the average thickness (t1) may be less than about 400 nm, or less than about 350 nm, or less than about 300 nm, or less than about 250 nm, or less than about 200 nm. In some aspects, the first optical filter may further include at least one skin layer (26) having an average thickness of greater than about 500 nm, or greater than about 750 nm, or greater than about 1000 nm, or greater than about 1500 nm, or greater than about 2000 nm.

In some embodiments, a bonding layer (81) bonds the first optical filter (20) to a layer (80) adjacent to the first optical filter (20). In some aspects, the layer (80) adjacent to the first optical filter (20) may be an optically diffusing layer (80) disposed on the light exit surface (12) of the extended light source (10). The optically diffusing layer (80) can employ scattering elements to help scatter emitted light (11) from the light exiting surface (12), which usually is highly oblique, into a range of directions so that a viewer may perceive light to originate from an increased area. The scattering characteristics of the optically diffusing layer (80) also help to blur any spatial non-uniformities for the benefit of the viewer. The optically diffusing layer (80) may be any suitable diffuser film or plate.

In some aspects, the diffusing layer (80) may include surface diffusers, bulk diffusers, and/or embedded diffusers. The diffuser according to some embodiments in this disclosure, may be a separate layer or coating having diffusive properties with respect to visible light or a surface treatment on a layer of the backlight unit of the present disclosure that provides diffusive properties to the treated surface (e.g., a surface diffuser). For example, the diffusive element may be a separate layer (e.g., a bulk diffuser) that diffuses visible light and that is either coextruded, coated, or laminated to another layer of the backlight unit of the present disclosure. In some embodiments, the diffusing layer (80) can be applied as a coating (e.g., a beaded diffuser coating). The diffuser layer (80) can further facilitate uniform spreading and recycling of light.

According to an embodiment, the display system (400) may include one or more light converting regions (30) configured to receive the generated source light (14a) from the one or more light emitting sources (14). The one or more light converting regions (30) may include one or more light converting films (30a, 30b, 30c) disposed between the first optical filter (20) and the light exit surface (12) of the extended light source (10). The generated source light (14a) exits the light exit surface (12) toward the one or more light converting films. The generated source light (14a) has a shorter wavelength than the wavelength emitted from the color conversion films (30a, 30b, 30c). The one or more light converting films (30a, 30b, 30c) may be substantially co-extensive in a length (x-axis) and a width (y-axis) with the light exit surface (12) of the extended light source (10). In some aspects, the first optical filter (20) may be substantially co-extensive in a length (x-axis) and a width (y-axis) with the one or more light converting regions (30). The light converting films (30a, 30b, 30c) is configured to provide uniform distribution and luminance uniformity of emitted light than the light emitted by the light emitting sources (14) including the LEDs.

Figure 3:
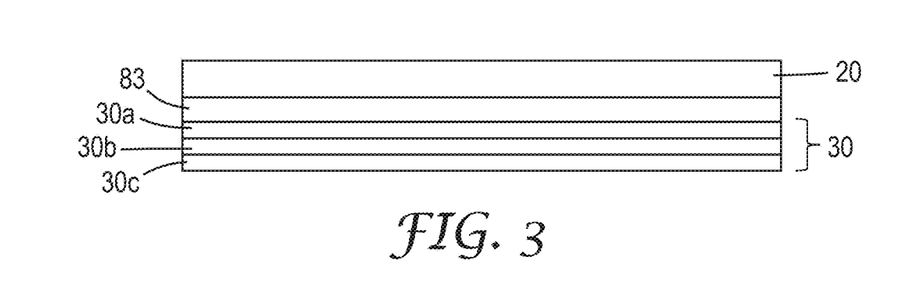
FIG. 3 is a schematic cross-sectional view of light conversion films bonded to an optical filter according to some embodiments.

In some aspects, a bonding layer (83) may be disposed to bond the optical filter (20) to the one or more light converting films (30a, 30b, 30c) as shown in FIG. 3. The bonding layer (83) may be an optically clear adhesive.

Light converting films (30a, 30b, 30c) having one or more light converting materials are usually configured to receive light having a first wavelength and, in response, emit a second light having one or more different second wavelengths. In some cases, the first wavelength may be smaller than the one or more different second wavelengths. For instance, the first wavelength may be less than about 420 nm and the one or more different second wavelengths may be greater than about 420 nm. For example, light emitting sources (14) including LEDs usually emit blue light, and the light converting films (30a, 30b, 30c) may be configured to convert a portion of the blue light into red and green components. The one or more light converting materials can include photoluminescent substances, fluorescent substances or dyes, phosphors such as blue/green/red phosphors, quantum dots, semiconductor-based optical converters, or the like. Light-converting materials also can include rare earth elements.

In the embodiment illustrated in FIG. 1, the one or more light converting films (30a, 30b, 30c) may include one or more light converting materials configured to receive the emitted light (11) from the extended light source (10) and convert at least portions of the received emitted light having the emitted wavelength (13) to blue (31a), green (32a) and red (33a) lights. As shown in FIG. 5, the blue (31a), green (32a) and red (33a) lights include respective blue (31b), green (32b) and red (33b) wavelengths. The emitted wavelength (13) is less than the blue wavelength (31b). In some cases, the blue wavelength can be between about 420 nm and about 480 nm, the green wavelength can be between about 490 nm and about 560 nm, and the red wavelength can be between about 590 nm and 670 nm.

Figure 8:
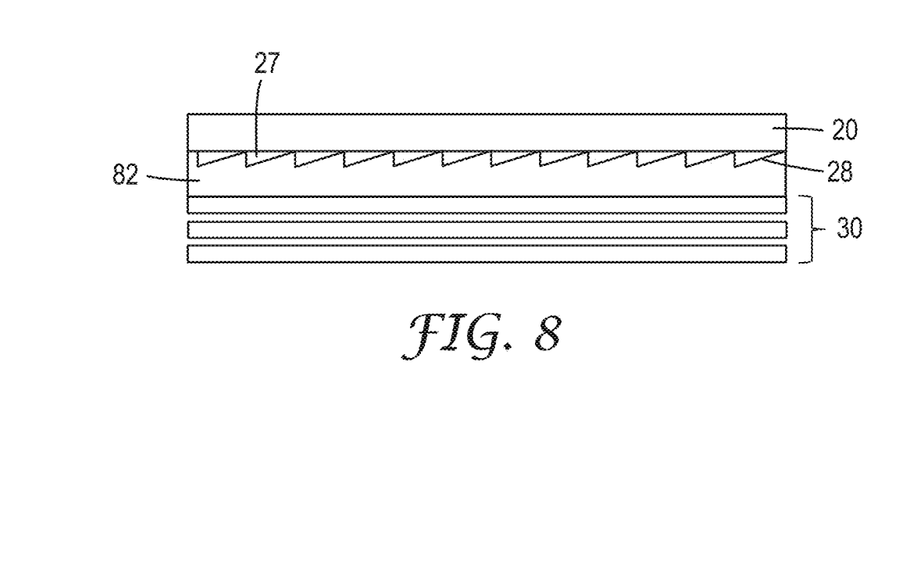
FIG. 8 is a schematic view of the construction of the optical filter according to an embodiment.

The first optical filter (20) may be configured to receive and selectively transmit the light converted by the light converting regions (30). The first optical filter (20) may be configured to reflect the transmitted portion of the blue light having the emitted wavelength (13) emitted from the light emitting sources (14), such that the reflected portion of the blue light is recycled. The first optical filter (20) may be further configured to transmit the blue (31a), green (32a) and red (33a) lights emitted from the one or more light converting films (30a, 30b, 30c) to output a white light. The display device (50) may be configured to receive at least some of the blue (31a), green (32a) and red (33a) lights and form an image (51). In some embodiments, as illustrated in FIG. 8, the first optical filter (20) may include a plurality of regularly arranged structures (27) at a major surface (28) thereof. The structures may be embedded in a bonding layer (82) bonding the first optical filter (20) to an adjacent layer. In some instances, the adjacent layer may be the one or more light converting regions (30). In some cases, the first optical filter (20) may be a UV cut mirror, or a dichroic filter. In an exemplary embodiment, the thickness of the first optical filter (20) may be between 10 to 30 um, or between 15 to 25 um.

Figure 2:
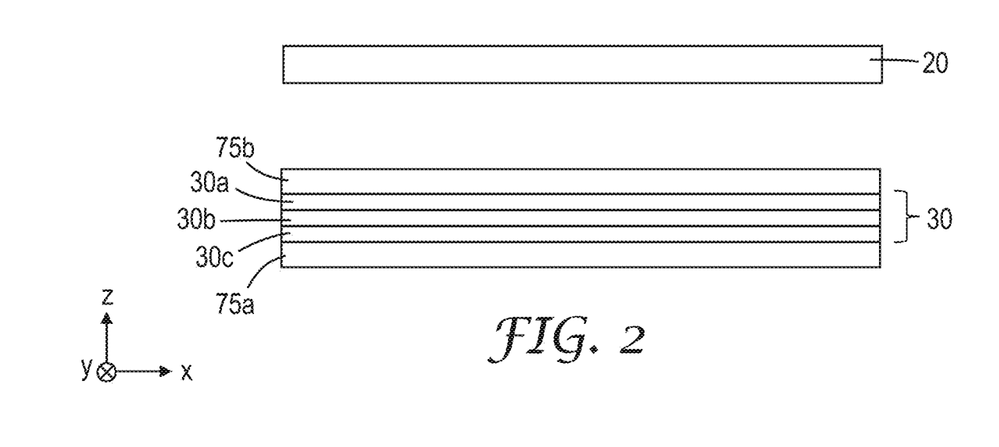
FIG. 2 is a schematic cross-sectional view of light conversion films with barrier layers according to an embodiment.

In some aspects, as illustrated in FIG. 2, one or more barrier layers (75a, 75b) may be disposed on the one or more light converting films (30a, 30b, 30c). The barrier layers (75a, 75b) may have lower oxygen permeability and/or water vapor permeability than the light converting films (30a, 30b, 30c). The one or more barrier layers (75a, 75b) substantially support and protect the one or more light converting films (30a, 30b, 30c) by substantially blocking moisture or gas from permeating into the light converting films (30a, 30b, 30c). In some instances, the one or more light converting films (30a, 30b, 30c) may be disposed between the first (75a) and second (75b) barrier layers.

The barrier layers (75a, 75b) may be made of the same or different materials. The thickness of the barrier layers (75a, 75b) may also be same or different. The barrier layers (75a, 75b) may be composed of inorganic materials or polymers that transmit light and have a high blocking property with respect to moisture and/or oxygen, for example, SiCN or SiO2, or, polyethylene, polypropylene, polyvinyl chloride, polyvinyl alcohol, ethylene vinylalcohol, polychlorotriplefluoroethylene, polyvinylidene chloride, nylon, polyamino ether, and cycloolefin-based homopolymer or copolymer.

FIG. 5 illustrates the generated spectrum (14b) of the light (11) emitted by the light emitting sources (14) shown in FIG. 1. The generated or source spectrum (14b) may include a generated or source intensity peak (14c) at a generated or source peak wavelength (14d) and a corresponding generated or source full width at half maximum FWHM (14e) that includes the emitted peak wavelength (13).

FIG. 5 further illustrates the optical transmittance (23) curve of the first optical filter (20) configured as a multilayer optical film including a plurality of polymeric layers (21, 22). Referring to FIGS. 4 and 5, in some embodiments, for a substantially normally incident light (40) and for at least an in-plane first polarization state (x-axis, y-axis), the plurality of the polymeric layers (21, 22) of the first optical film (20) may have an average optical reflectance (1−T1) of more than about 80% of the incident light (40) having the emitted wavelength (13). In some cases, the plurality of the polymeric layers (21, 22) may reflect (1−T1) greater than 85%, or greater than 90%, or greater than 95%, or greater than 96%, or greater than 97%, or greater than 98%, or greater than 99%, or greater than 99.5% of the incident light (40) having the emitted wavelength (13).

In some embodiments, for a substantially normally incident light (40) and for at least an in-plane first polarization state (x-axis, y-axis), the plurality of the polymeric layers (21, 22) may have an average optical transmittance (31c, 32c, 33c) of greater than about 60% of the incident light (40) for each of the blue (31b), green (32b) and red (33b) wavelengths of the blue (31a), green (32a) and red (33a) lights emitted by the light converting films (30a, 30b, 30c). In some cases, the plurality of the polymeric layers (21, 22) may transmit (31c, 32c, 33c) greater than about 65%, or greater than about 70%, or greater than about 75%, or greater than about 80%, or greater than about 85% of the incident light (40) for each of the blue (31b), green (32b) and red (33b) wavelengths of the blue (31a), green (32a) and red (33a) lights emitted by the light converting films (30a, 30b, 30c).

In some aspects, the first optical filter (20) may have an optical absorption of less than about 1%, or less than about 0.5%, or less than about 0.25%, or less than about 0.1%, or less than about 0.05%, or less than about 0.01%, or less than about 0.005%, or less than about 0.001% at the emitted wavelength (13) for each of the first polarization state (x-axis) and an in-plane second polarization state (y-axis) orthogonal to the first polarization state.

As shown in FIG. 5, the first optical filter (20) has a low transmittance over a shorter wavelength range (41) (see transmittance curve 23). In some cases, the shorter wavelength range (41) may be at least 10 nm, or 15 nm, or 20 nm, or 25 nm, or 30 nm, or 35 nm, or 40 nm wide, and includes the emitted wavelength (13). The average optical reflectance (1-T1) of the plurality of polymeric layers (21, 22) in the short wavelength range (41) may be greater than about 80%, or greater than about 85%, or greater than about 90%, or greater than about 95%, or greater than about 96%, or greater than about 97%, or greater than about 98%, or greater than about 99%, or greater than about 99.5%.

For the substantially normally incident light (40) and for the at least the in-plane first polarization state, the optical transmittance (23) of the plurality of polymeric layers (21, 22) versus wavelength may include a band edge (24) separating the shorter wavelength range (41) from a longer wavelength range (42). The longer wavelength range (42) may be at least 50 nm, or 60 nm, or 70 nm, or 80 nm, or 90 nm, or 100 nm, or 120 nm, or 140 nm wide, and may include each of the blue (31b), green (32b) and red (33b) wavelengths. The average optical transmittance of the plurality of polymeric layers (21, 22) in the longer wavelength range (42) may be greater than about 60%, or greater than 65%, or greater than 70%, or greater than 75%, or greater than 80%, or greater than 85%, or greater than 87%.

Figure 6:
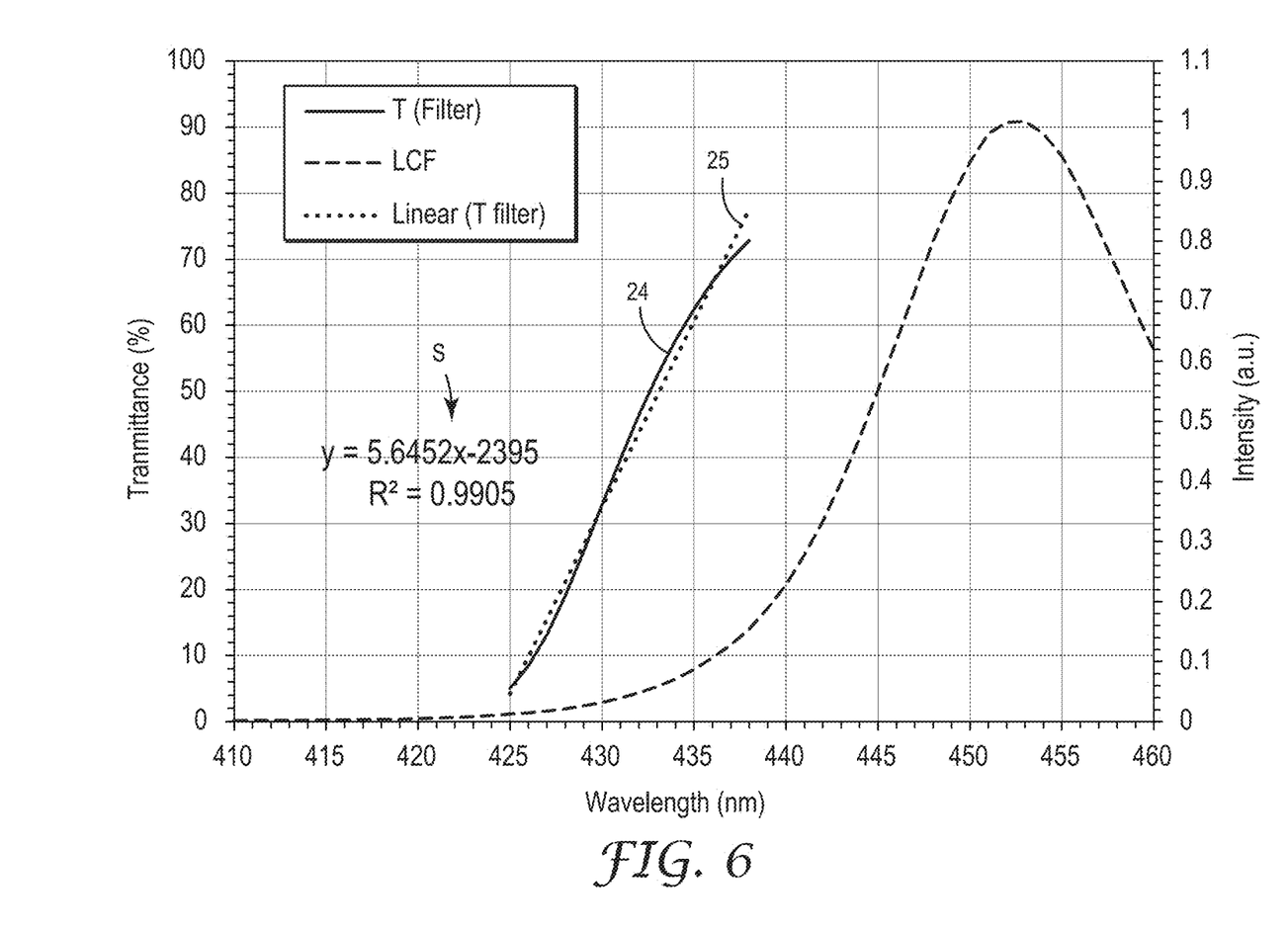
FIG. 6 illustrates the best linear fit to the band edge of the optical transmittance of the optical filter across a wavelength range.

A best linear fit (25) to the band edge (24) at least across a wavelength range along the transmission band edge (24) is shown in FIG. 6. In some aspects, the best linear fit (25) to the band edge (24) across a wavelength range where the optical transmittance increases from about 10% to about 60% may have a positive slope (S) of greater than about 2%/nm, or greater than about 2.5%/nm, or greater than about 3%/nm, or greater than about 3.5%/nm, or greater than about 4%/nm, or greater than about 4.5%/nm, or greater than about 5%/nm, or greater than about 5.5%/nm, or greater than about 5.6%/nm.

The one or more light converting regions (30) is configured to receive the source light (14a) from the one or more light sources (14) and, in response, emit a converted light having blue (34b), green (34g) and red (34r) converted spectra. FIG. 5 further illustrates the converted spectra of the one or more light converting materials of the light converting films (30a, 30b, 30c). The one or more light converting materials may include the blue (34b), green (34g) and red (34r) emission or converted spectra having respective blue (35b), green (35g) and red (35r) emission or converted peaks at respective blue (36b), green (36g) and red (36r) emission or converted peak wavelengths. The blue (34b), green (34g) and red (34r) emission spectra further includes respective blue (37b), green (37g) and red (37r) emission full width at half maxima (FWHMs). The blue emission FWHM includes the blue wavelength (31b), the green emission FWHM includes the green wavelength (32b), and the red emission FWHM includes the red wavelength (33b).

In some aspects, the blue converted peak wavelength (36b) may be greater than the source peak wavelength (14d). The blue (36b), green (36g) and red (36r) converted peak wavelengths may be at least 20 nm, or 30 nm, or 40 nm, or 50 nm, or 60 nm apart from each other and disposed in a visible wavelength range extending from about 420 nm to about 680 nm.

In some embodiments, referring back to FIG. 1, the display system (400) may include a reflective polarizer (60). The reflective polarizer (60) used in the display system of the present description may be any suitable type of reflective polarizer. The reflective polarizer may be a polymeric multilayer optical film that may be substantially uniaxially oriented as described further elsewhere. Substantially uniaxially oriented reflective polarizers are available from 3M Company under the trade designation Advanced Polarizing Film 5 or APF. Other types of multilayer optical film reflective polarizers may also be used, which have low reflectivity for light polarized with component along one in-plane axis, and high reflectivity for light polarized with component along the second, orthogonal in-plane axis. In some embodiments, other types of reflective polarizers (e.g., wire-grid polarizers) are used.

The first optical filter (20) may be disposed between the reflective polarizer (60) and the light exit surface (12) of the extended light source (10). The reflective polarizer (60) may transmit a polarization state useful for the display device (50), recycling the orthogonal polarization to enhance brightness and uniformity. In some embodiments, the reflective polarizer (60) may be configured as a polymeric multilayer optical film including a plurality of second polymeric layers (21, 22), as shown in FIG. 4.

The number of the plurality of second polymeric layers (21, 22) may be at least 10, or at least 20, or at least 50, or at least 75, or at least 100, or at least 150, or at least 200, or at least 250, or at least 300, or at least 400 in total. Each of the second polymeric layers (21, 22) may have an average thickness (t1) of less than about 500 nm. In some instances, the average thickness (t1) may be less than about 400 nm, or less than about 350 nm, or less than about 300 nm, or less than about 250 nm, or less than about 200 nm. In some aspects, the first optical filter (20) and/or the reflective polarizer (60) may further include at least one skin layer (26) having an average thickness of greater than about 500 nm, or greater than about 750 nm, or greater than about 1000 nm, or greater than about 1500 nm, or greater than about 2000 nm.

For a substantially normally incident light (40), the reflective polarizer (60) including the plurality of second polymeric layers (21, 22) may reflect more than about 60% of the incident light having the in-plane first polarization state (x-axis). In some embodiments, the reflective polarizer (60) including the plurality of second polymeric layers (21, 22) may reflect at least 70%, or at least 80%, or at least 90% of the incident light having the in-plane first polarization state (x-axis).

For a substantially normally incident light (40), the reflective polarizer (60) including the plurality of second polymeric layers (21, 22) may transmit at least 60% of the incident light having an in-plane orthogonal second polarization state (y-axis). In some embodiments, the reflective polarizer (60) including the plurality of second polymeric layers (21, 22) may transmit at least 70%, or at least 80%, or at least 90%, or at least 95% of the incident light having the in-plane orthogonal second polarization state (y-axis).

In some embodiments, one or more brightness enhancement films, for example, prismatic films (70, 72), may be disposed between the display device (50) and the extended light source (10). The prismatic films (70, 72) are usually optically transparent. The prismatic films (70, 72) may be configured to transmit light in an angle distribution to enhance axial illumination, while redirecting and recycling a portion to improve uniformity and brightness. The prismatic films (70, 72) can also split the incident images to further enhance uniformity. Exemplary prismatic films (70, 72) useful for increasing the brightness of the display device (50) are offered by 3M Company as Vikuiti™ Brightness Enhancement Films (BEF).

In some aspects, the first optical filter (20) may be disposed between a first prismatic film (70) and the light exit surface (12) of the extended light source (10). The first prismatic film (70) may include a plurality of first prisms (71) extending along substantially a same first longitudinal direction (y-axis). In some aspects, the first prismatic film (70) may be disposed between a second prismatic film (72) and the light exit surface (12) of the extended light source (10). The second prismatic film (72) may include a plurality of second prisms (73) extending along substantially a same second longitudinal direction (x-axis) different from the first longitudinal direction (y-axis).

The prism peaks of at least one of the first and second prisms (71, 73) may be rounded or truncated to achieve particular optical characteristics. As light from the light exit surface (10) passes through at least one of the first and second prismatic films (70, 72) and encounters at least one of the first and second prisms (71, 73), a portion of the light is refracted in the optical axis direction, while another portion of the light is reflected back by total internal reflection. The reflected light may be recycled until it eventually emerges from the display device (50).

In some embodiments, a second optical filter (74) may be disposed between the extended light source (10) and the one or more light converting films (30a, 30b, 30c). The second optical filter (74) may be a multilayer polymeric optical film similar to the first optical filter (20) described earlier.

For substantially normally incident light, and for at least the in-plane first polarization state (x-axis, y-axis), the second optical filter (74) substantially reflects light for each of the blue (31b), green (32b) and red (33b) wavelengths and substantially transmits light for the emitted wavelength (13). In some embodiments, for a substantially normally incident light (40), the second optical filter (74) may be said to substantially reflect light if more than about 80% of the incident light having each of the blue (31b), green (32b) and red (33b) wavelengths is reflected by the second optical filter (74). In some embodiments, more than about 85%, or more than about 90%, or more than about 95%, or more than about 96%, or more than about 97%, or more than about 98%, or more than about 99%, or more than about 99.5% of the incident light having each of the blue (31b), green (32b) and red (33b) wavelengths is reflected by the second optical filter (74).

In some embodiments, for a substantially normally incident light (40) having the emitted wavelength (13), the second optical filter (74) may be said to substantially transmit light if greater than about 60% of incident light having the emitted wavelength (13) is transmitted by the second optical filter (74). In some embodiments, at least 65%, or at least 70%, or at least 75%, or at least 80%, or at least 85%, or at least 90%, or at least 95% of the incident light having the emitted wavelength (13) is transmitted by the second optical filter (74).

In some embodiments, a light absorbing layer (110) may be disposed on the first optical filter (20) opposite the light exit surface (12) of the extended light source (10). The light absorbing layer (110) refers to an optical film that only absorbs light in a particular wavelength range. The light absorbing layer may be a material obtained by mixing carbon black or carbon nanotube with an existing binder material.

For substantially normally incident light, and for at least the in-plane first polarization state (x-axis, y-axis), the light absorbing layer (110) substantially absorbs light having the emitted wavelength (13). In some embodiments, for a substantially normally incident light (40), the light absorbing layer (110) may be said to substantially absorb light if more than about 50% of the incident light having the emitted wavelength (13) is absorbed by the light absorbing layer (110). In some embodiments, more than about 55%, or more than about 60%, or more than about 65%, or more than about 70%, or more than about 75%, or more than about 80%, or more than about 85%, or more than about 90%, or more than about 95% of the incident light having the emitted wavelength (13) is absorbed by the light absorbing layer (110).

In some embodiments, one or more layers in the display system (400), alone or in combination, have an optical absorbance of more than about 50%, or more than about 55%, or more than about 60%, or more than about 65%, or more than about 70%, or more than about 75%, or more than about 80%, or more than about 85%, or more than about 90%, or more than about 95% at the emitted wavelength (13).

Figure 7:
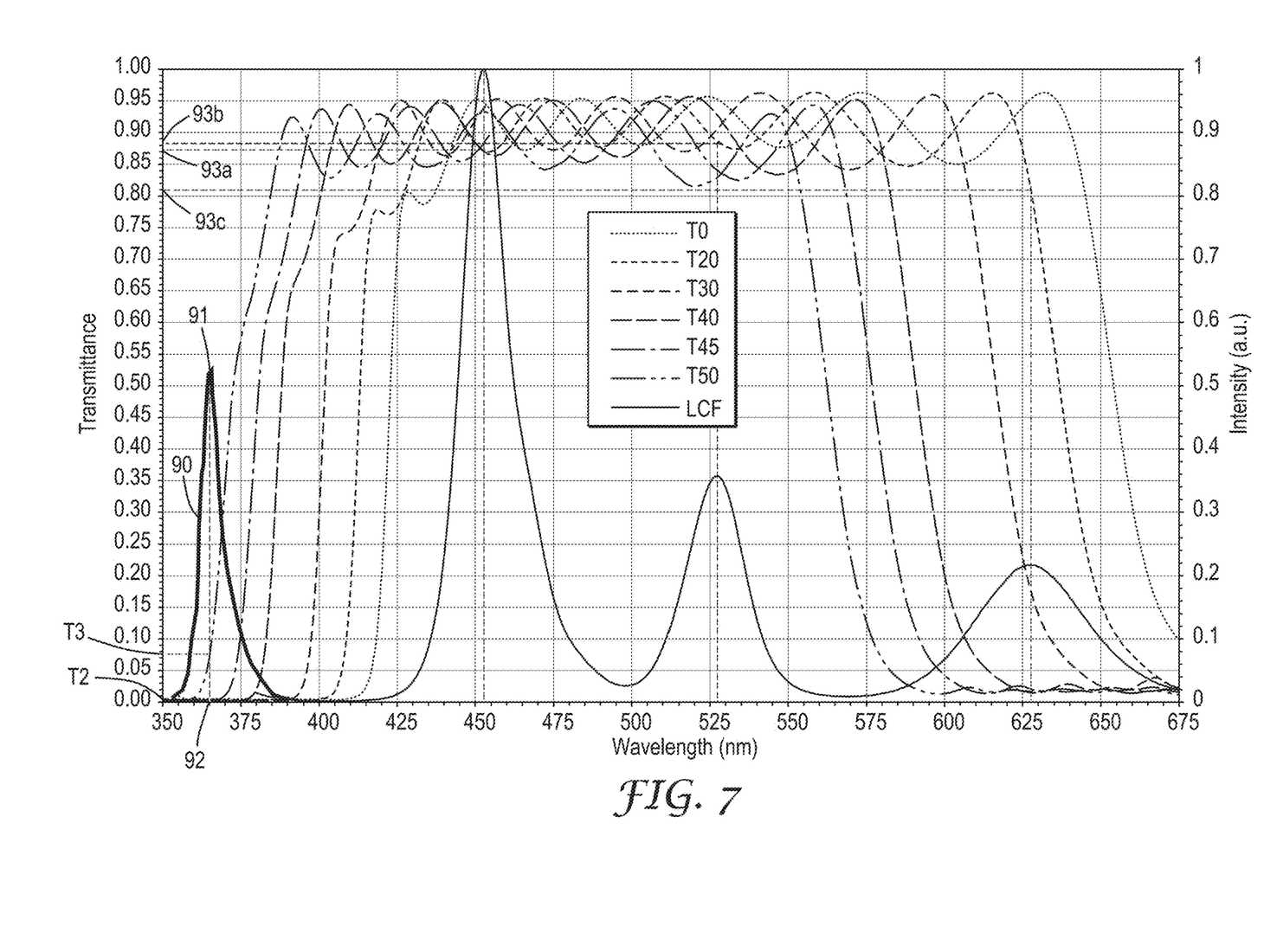
FIG. 7 illustrates the emission curve of the light emitted by the light emitting sources, the transmittance versus wavelength of the optical filter at different incident angles, and the emission curve of the light conversion films according to some embodiments.

FIG. 7 illustrates the source spectrum (90) of the source light (14a) emitted by the one or more light sources (14) shown in FIG. 1. The source spectrum (90) includes an intensity source peak (91) at a source peak wavelength (92). FIG. 7 further illustrates the transmittance versus wavelength of the first optical filter (20) at different incident angles.

For each of in-plane orthogonal first (x-axis) and second (y-axis) polarization states and for incident angles of up to at least 20 degrees, or up to at least 25 degrees, or up to at least 30 degrees, or up to at least 35 degrees, or up to at least 40 degrees, or up to at least 45 degrees, or up to at least 50 degrees, the first optical filter (20) substantially reflects light at the source peak wavelength (92) and substantially transmits light at each of the blue (36b), green (36g) and red (36r) converted peak wavelengths. For example, the first optical filter (20) may be said to substantially reflect light if the optical reflectance (1−T2) of the first optical filter (20) is more than about 60%, or more than about 65%, or more than about 70%, or more than about 80%, or more than about 85%, or more than about 90% at the source peak wavelength (92). The first optical filter (20) may be said to substantially transmit light if the optical transmittance (93a, 93b, 93c) of the first optical filter (20) is greater than 60%, or more than about 65%, or more than about 70%, or more than about 75%, or more than about 80% at each of the blue (36b), green (36g) and red (36r) converted peak wavelengths.

In some embodiments, the first optical filter (20) may have an optical absorption of less than about 1%, or less than about 0.5%, or less than about 0.25%, or less than about 0.1%, or less than about 0.05%, or less than about 0.01%, or less than about 0.005%, or less than about 0.001% at the source peak wavelength (92) for each of the first and second polarization states.

In another embodiment, referring back to FIG. 1, the display system (400) may include an extended light source (100) configured to emit light (102, 31a, 32a, 33a) from an emission surface (101). As shown in FIGS. 5, the emitted light may include first (14b), second (34b), third (34g) and fourth (34r) emission spectra including respective first (14c), second (35b), third (35g) and fourth (35r) emission peaks at respective first (14d), second (36b), third (36g) and fourth (36r) peak wavelengths with respective non-overlapping first (14e), second (37b), third (37g) and fourth (37r) full width at half maxima (FWHMs). The first peak wavelength may be less than about 420 nm. The first peak wavelength may be less than the second peak wavelength, the second peak wavelength may be less than the third peak wavelength, and the third peak wavelength may be less than the fourth peak wavelength.

The display system includes an optical stack (200) including one or more light converting films (30a, 30b, 30c) configured to receive a first light (14a) having the first spectra (14d, 90) and in response, emit light (31a, 32a, 33a) having the second (34b), third (34g) and fourth (34r) emission spectra. The optical stack further includes the optical filter (20) disposed on, and substantially co-extensive in a length (x-axis) and a width (y-axis) with, the one or more light converting films (30a, 30b, 30c). In some aspects, the optical filter (20), as described previously, may be disposed on, and may be substantially co-extensive in a length (x-axis) and a width (y-axis) with, the emission surface (101) of the extended light source (100).

For each of in-plane orthogonal first and second polarization states and for incident angles of up to at least 20 degrees, or up to at least 25 degrees, or up to at least 30 degrees, or up to at least 35 degrees, or up to at least 40 degrees, or up to at least 45 degrees, or up to at least 50 degrees, the optical filter (20) substantially reflects light at the first peak wavelength (14d) and substantially transmits light at each of the second (36b), third (36g) and fourth (36r) peak wavelengths. For example, the optical filter (20) may be said to substantially reflect light if the optical reflectance (1-T2) of the optical filter (20) is more than about 60% at the first peak wavelength (14d). In some embodiments, the optical filter (20) may reflect more than about 65%, or more than about 70%, or more than about 80%, or more than about 85%, or more than about 90% of light at the first peak wavelength (14d). The optical filter (20) may be said to substantially transmit light if the optical transmittance (93a, 93b, 93c) of the optical filter (20) is greater than 60% at each of the second (36b), third (36g) and fourth (36r) peak wavelengths. In some embodiments, the optical filter (20) may transmit more than about 65%, or more than about 70%, or more than about 75%, or more than about 80% at each of the first (36b), second (36g) and third (36r) peak wavelengths.

Figure 9:
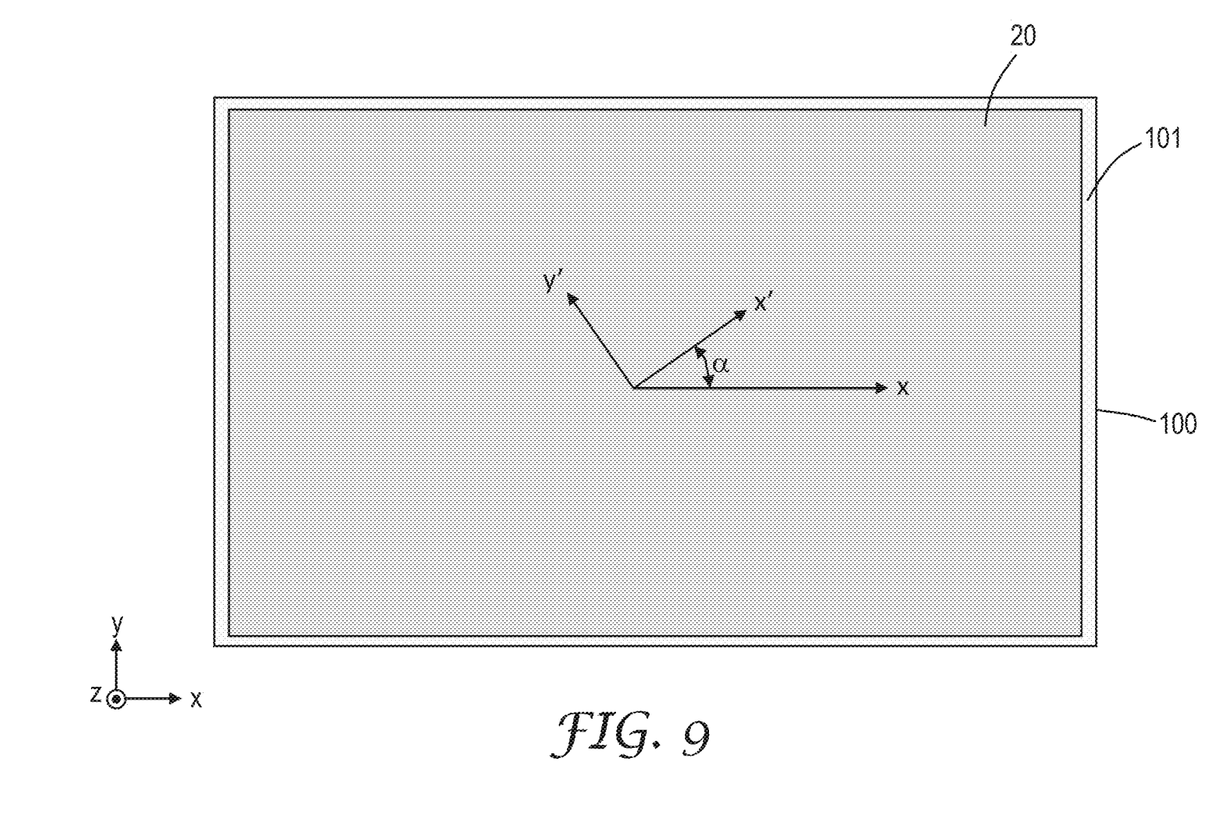
FIG. 9 is a schematic view of an angular orientation between the in-plane first polarization state and length direction of the optical film according to some embodiments.

FIG. 9 shows the direction of the first polarization state with respect to the length direction of the optical film. The first polarization state may be along a direction (x') that makes an oblique angle ($\alpha$) with the length direction (x-axis) of the optical film.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

The invention claimed is:

1. A display system comprising:
    an extended light source configured to emit light from a light exit surface thereof, the emitted light having an emitted wavelength;
    a first optical filter disposed on, and substantially co-extensive in a length and a width with, the light exit surface of the extended light source and comprising a plurality of polymeric layers numbering at least 10 in total, each of the polymeric layers having an average thickness of less than about 500 nm; and
    one or more light converting films disposed between the first optical filter and the light exit surface of the extended light source and comprising one or more light converting materials configured to receive the emitted light from the extended light source and convert at least portions of the received emitted light to blue, green and red lights having respective blue, green and red wavelengths,
    such that for a substantially normally incident light and for at least an in-plane first polarization state, the plurality of the polymeric layers reflects more than about 80% of the incident light having the emitted wavelength, and transmits greater than about 60% of the incident light for each of the blue, green and red wavelengths.

2. The display system of claim 1, wherein the blue wavelength is between about 420 nm and about 480 nm, the green wavelength is between about 490 nm and about 560 nm, and the red wavelength is between about 590 nm and 670 nm.

3. The display system of claim 1, wherein for the substantially normally incident light and for the at least the in-plane first polarization state, an optical transmittance of the plurality of polymeric layers versus wavelength comprises a band edge separating a shorter wavelength range that is at least 10 nm wide and comprises the emitted wavelength, and where the plurality of polymeric layers has an average optical reflectance of greater than about 80% from a longer wavelength range that is at least 50 nm wide and comprises each of the blue, green and red wavelengths, and wherein the plurality of polymeric layers has an average optical transmittance of greater than about 60%.

4. The display system of claim 3, wherein a best linear fit to the band edge at least across a wavelength range along the band edge where the optical transmittance increases from about 10% to about 60%, has a positive slope of greater than about 2%/nm.

5. The display system of claim 1, wherein the one or more light converting materials comprise blue, green and red emission spectra comprising respective blue, green and red emission peaks at respective blue, green and red emission peak wavelengths with respective blue, green and red emission full width at half maxima (FWHMs), wherein the blue emission FWHM comprises the blue wavelength, the green emission FWHM comprises the green wavelength, and the red emission FWHM comprises the red wavelength.

6. The display system of claim 1 further comprising a reflective polarizer, the first optical filter disposed between the reflective polarizer and the light exit surface of the extended light source, the reflective polarizer comprising a plurality of second polymeric layers numbering at least 10 in total, each of the second polymeric layers having an average thickness of less than about 500 nm, such that for a substantially normally incident light, the plurality of second polymeric layers reflects more than about 60% of the incident light having the in-plane first polarization state and transmits more than about 60% of the incident light having an in-plane orthogonal second polarization state.

7. The display system of claim 1, wherein the first optical filter further comprises at least one skin layer having an average thickness of greater than about 500 nm.

8. The display system of claim 1, wherein the first optical filter has an optical absorption of less than about 1% at the emitted wavelength for each of the first polarization state and an in-plane second polarization state orthogonal to the first polarization state.

9. The display system of claim 1 further comprising a light absorbing layer disposed on the first optical filter opposite the light exit surface of the extended light source, such that for the substantially normally incident light and for the at least the in-plane first polarization state, the light absorbing layer absorbs more than about 50% of the incident light having the emitted wavelength.

10. The display system of claim 1 further comprising a display panel configured to receive at least some of the blue, green and red lights and form an image.

11. The display system of claim 1, wherein the emitted wavelength is less than the blue wavelength.

12. The display system of claim 1, wherein the extended light source comprises one or more light emitting sources configured to generate light exiting the light exit surface toward the one or more light converting films, the generated light comprising a generated spectrum comprising a generated intensity peak at a generated peak wavelength and a corresponding generated full width at half maximum FWHM that comprises the emitted wavelength.

13. The display system of claim 1 further comprising a second optical filter disposed between the extended light source and the one or more light converting films, such that for a substantially normally incident light and for the at least the in-plane first polarization state (x-axis, y-axis), the second optical filter reflects more than about 80% of the incident light for each of the blue, green and red wavelengths, and transmits greater than about 60% of the incident light for the emitted wavelength.

14. A display system comprising:
one or more light sources configured to emit a source light comprising a source spectrum comprising an intensity source peak at a source peak wavelength;
one or more light converting regions configured to receive the source light from the one or more light sources and in response, emit a converted light comprising blue, green and red converted spectra comprising respective blue, green and red converted peaks at respective blue, green and red converted peak wavelengths, the blue converted peak wavelength greater than the source peak wavelength, the blue, green and red converted peak wavelengths being at least 20 nm apart from each other and disposed in a visible wavelength range extending from about 420 nm to about 680 nm; and
an optical filter configured to receive and selectively transmit the converted light, such that for each of in-plane orthogonal first and second polarization states and for incident angles of up to at least 20 degrees, the optical filter has an optical reflectance of more than about 60% at the source peak wavelength, and an optical transmittance of greater than about 60% at each of the blue, green and red converted peak wavelengths.

15. The display system of claim 14, wherein for each of the first and second polarization states and for incident angles of up to at least 40 degrees, the optical filter has an optical reflectance of more than about 60% at the source peak wavelength, and an optical transmittance of greater than about 60% at each of the blue and green converted peak wavelengths.

16. The display system of claim 14, wherein the optical filter comprises a plurality of polymeric layers numbering at least 10 in total, each of the polymeric layers having an average thickness of less than about 500 nm.

17. The display system of claim 14, the optical filter is substantially co-extensive in a length and a width with the one or more light converting regions.

18. The display system of claim 14, wherein the optical filter has an optical absorption of less than about 1% at the source peak wavelength for each of the first and second polarization states.

19. An optical stack comprising:
one or more light converting films configured to receive a first light having a first spectra comprising a first peak at a first peak wavelength and a corresponding first full width at half maximum (FWHM), and in response, emit light having second, third and fourth emission spectra comprising respective second, third and fourth emission peaks at respective second, third and fourth peak wavelengths with respective second, third and fourth FWHMs, wherein the first, second, third and fourth FWHM are non-overlapping; and
an optical filter disposed on, and substantially co-extensive in a length and a width with, the one or more light converting films and comprising a plurality of polymeric layers numbering at least 10 in total, each of the polymeric layers having an average thickness of less than about 500 nm;
such that for each of in-plane orthogonal first and second polarization states and for incident angles of up to at least 20 degrees, the optical filter has an optical reflectance of more than about 60% at the first peak wavelength, and an optical transmittance of greater than about 60% at each of the second, third and fourth peak wavelengths.

\* \* \* \* \*